United States Patent
He et al.

(10) Patent No.: US 10,291,458 B2
(45) Date of Patent: May 14, 2019

(54) METHODS AND DEVICES FOR TRANSMISSION/RECEPTION OF DATA FOR HYBRID CARRIER MODULATION MIMO SYSTEM

(71) Applicant: ZTE Wavetone Science and Technology Ltd., Nanjing, Jiangsu (CN)

(72) Inventors: Shiwen He, Jiangsu (CN); Bo Wu, Jiangsu (CN); Haiming Wang, Jiangsu (CN); Yongming Huang, Jiangsu (CN); Jun Zhang, Jiangsu (CN)

(73) Assignee: ZTE Wavestone Science and Technology Ltd., Nanjing, Jiangsu (CN)

(*) Notice: Subject to any disclaimer, the term of this patent is extended or adjusted under 35 U.S.C. 154(b) by 71 days.

(21) Appl. No.: 15/506,000

(22) PCT Filed: Dec. 29, 2014

(86) PCT No.: PCT/CN2014/095281
§ 371 (c)(1),
(2) Date: Feb. 23, 2017

(87) PCT Pub. No.: WO2016/029609
PCT Pub. Date: Mar. 3, 2016

(65) Prior Publication Data
US 2017/0257250 A1    Sep. 7, 2017

(30) Foreign Application Priority Data
Aug. 27, 2014 (CN) .......................... 2014 1 0431695

(51) Int. Cl.
*H04L 27/32* (2006.01)
*H04L 27/26* (2006.01)
(Continued)

(52) U.S. Cl.
CPC ............ *H04L 27/32* (2013.01); *H04L 5/0044* (2013.01); *H04L 5/0053* (2013.01);
(Continued)

(58) Field of Classification Search
CPC . H04L 27/32; H04L 27/2602; H04L 27/2613; H04L 27/2636; H04L 27/2601; H04B 7/0413
(Continued)

(56) References Cited

U.S. PATENT DOCUMENTS

2003/0058952 A1* 3/2003 Webster .............. H04L 25/0226
375/260
2010/0086076 A1 4/2010 Lakkis
(Continued)

FOREIGN PATENT DOCUMENTS

| CN | 102208937 | 10/2011 |
|----|-----------|---------|
| CN | 102231648 | 11/2011 |
| CN | 104202288 | 12/2014 |

OTHER PUBLICATIONS

International Search Report of PCT/CN2014/095281 dated Apr. 22, 2015, 4 pages (English and Chinese).

*Primary Examiner* — Chieh M Fan
*Assistant Examiner* — Fitwi Y Hailegiorgis
(74) *Attorney, Agent, or Firm* — Rankin, Hill & Clark LLP

(57) ABSTRACT

A hybrid data transmission frame format for a hybrid single-carrier modulation and OFDM carrier modulation MIMO system and corresponding transmission/reception methods and devices. A transmitter employs single-carrier modulation for preambles and signaling fields via a single-carrier signal generator to produce single-carrier transmission sequences of transmission links. While to employs the same sampling rate to process all the data so as to match a (Continued)

receiver, the sampling rate of the single-carrier transmission sequences needs to be processed into being identical to that of OFDM via a pulse shaping multiphase filter before entering a digital-to-analog converter; the transmitter employs an OFDM modulation mode to transmit data field segments via an OFDM signal generator; and a data receiving process of the receiver is opposite to a data transmitting process of the transmitter.

15 Claims, 6 Drawing Sheets

(51) Int. Cl.
    *H04L 5/00*     (2006.01)
    *H04B 7/0413*     (2017.01)

(52) U.S. Cl.
    CPC ...... *H04L 27/2602* (2013.01); *H04L 27/2613* (2013.01); *H04L 27/2636* (2013.01); *H04B 7/0413* (2013.01); *H04L 27/2601* (2013.01)

(58) Field of Classification Search
    USPC .................................. 375/260, 267, 295, 316
    See application file for complete search history.

(56) References Cited

U.S. PATENT DOCUMENTS

| | | | |
|---|---|---|---|
| 2012/0195391 A1* | 8/2012 | Zhang | H04L 5/0048 375/295 |
| 2012/0249888 A1* | 10/2012 | Naik | H04B 1/0007 348/726 |

\* cited by examiner

METHODS AND DEVICES FOR TRANSMISSION/RECEPTION OF DATA FOR HYBRID CARRIER MODULATION MIMO SYSTEM

FIELD OF THE INVENTION

The present invention relates to a hybrid data transmission frame format that simultaneously realizes single carrier and orthogonal frequency division multiple access modulation mechanisms, and corresponding transmission/reception methods and devices, and belongs to the technical field of wireless communication.

BACKGROUND

As wireless spectrum resources become more and more scarce, millimeter wave communication has received extensive attention. High-throughput millimeter wave communication technology has become one of the most active fields of the wireless communication technology. In a millimeter wave band, there is an urgent need to reduce the peak to average ratio of baseband signals to reduce the design difficulty of a power amplifier. Compared with an orthogonal frequency division multiplexing (OFDM: Orthogonal Frequency Division Multiplexing) system, a single-carrier modulation mode has the advantages of low peak to average ratio, and still has similar receiver complexity and communication system performance with the OFDM. Therefore, a single-carrier system is widely used in the millimeter wave communication. However, the single-carrier system is more complex to implement pre-coding and multiuser, while the OFDM system can carry out a pre-coding design with lower complexity and carry out a pre-coding operation on the transmitted data, thus enhancing the reliability and the throughput of the system.

Based on the above findings, the combined use of single-carrier modulation and OFDM modulation is one of the key technologies of the millimeter wave communication. In the two IEEE802.11ad and IEEE802.11aj wireless local area network standards, preamble sequences and signaling fields are transmitted in a single-carrier modulation mode, while data fields are transmitted in an OFDM mode. The main reason of adopting the single-carrier transmission mode is to reduce the peak to average ratio (PAR: Peak to average ratio) of transmitted signals so as to reduce the design difficulty and the hardware implementation cost of the power amplifier. The main reason of adopting the OFDM transmission mode is to reduce the complexity of the receiving mechanism and improve the system throughput. But a frame format and a transmission mode in the EE802.11ad standard frame designed by the array antenna technology cannot be directly used in a multiple input multiple output (MIMO: Multiple Input Multiple Output) communication system. Based on the above findings, the present invention provides a hybrid data transmission frame format that can simultaneously support single-carrier modulation and OFDM carrier modulation MIMO systems, and corresponding transmission/reception methods and devices.

BRIEF DESCRIPTION

Object of the invention: The present invention provides a hybrid data transmission frame format that can simultaneously support single-carrier modulation and OFDM carrier modulation MIMO systems, and corresponding transmission/reception methods and devices, in order to further improve the compatibility of a communication system.

Technical solution: To achieve the aforementioned object, the present invention adopts the following technical solution:

A data transmission method for a hybrid single-carrier modulation and OFDM carrier modulation MIMO system includes the following steps:

(A1) generating single-carrier transmission sequences with sampling rates of X on transmission links of an MIMO transmission device;

(A2) carrying out upsampling and downsampling processing on single-carrier transmission symbol sequences on the transmission links to form single-carrier transmission sequences with sampling rates of Y;

(A3) generating OFDM carrier transmission sequences with sampling rates of Y on the transmission links of the MIMO transmission device; and (A4) synthesizing the transmission sequences in steps (A2) and (A3) on the transmission links, carrying out digital-to-analog conversion, and transmitting the synthesized transmission sequence via a radio frequency module;

wherein, the single-carrier transmission sequences include synchronous training fields, channel estimation training fields and signaling fields A (SIG-A); the OFDM carrier transmission sequences include long training fields for estimating an equivalent channel for OFDM-MIMO transmission and data fields, and further include signaling fields B (SIG-B) between the long training fields and the data fields in a multiuser mode;

specific steps of step (A1) include:

(A11) generating the synchronous training fields and the channel estimation training fields on the $i_{TX}^{th}$ transmission link of the MIMO transmission device, $S_{preamble}^{iTX}$, $i_{TX}=1, \ldots, N_{TX}$, $N_{TX}$ represents the number of transmission antennas; and (A12) generating the SIG-A fields, carrying out basic baseband signal processing on the SIG-A, then carrying out cyclic shift diversity (CSD: Cyclic Shift Diversity) operation to map the SIG-A to the transmission links, respectively carrying out blocking and guard interval insertion operations on the SIG-A after the CSD on the transmission links, and merging the channel estimation training fields of the links to obtain the sequences $S_{preamble+SIG-A}^{iTX}$, $i_{TX}=1, \ldots, N_{TX}$ with the sampling rates of X.

The specific steps of step (A2) include:

(A21) carrying out upsampling and pulse shaping operations on the $S_{preamble+SIG-A}^{iTX}$ generated in step (A12) by adopting a pulse shaping multiphase filter to obtain sequences $\tilde{S}_{preamble+SIG-A}^{iTX}$ with sampling rates of Z, Z=[X, Y], wherein [X,Y] represents least common multiples of X and Y, $i_{TX}=1, \ldots, N_{TX}$; and (A22) carrying out Z/Y multiple downsampling on the $\tilde{S}_{preamble+SIG-A}^{iTX}$ obtained in step (A21) to obtain the single-carrier transmission sequences $S_{SC}^{iTX}$, $i_{TX}=1, \ldots, N_{TX}$ with the sampling rates of Y.

The specific steps of step (A3) include:

(A31) generating the long training fields for estimating the equivalent channel for the OFDM-MIMO transmission, transmitting the long training fields to the transmission links by a space mapping operation, and respectively carrying out inverse fast Fourier transform (IFFT: Inverse Fast Fourier Transform) and guard interval insertion operations on the long training fields on the transmission links to form transmission sequences $S_{LTF}^{iTX}$, $i_{TX}=1, \ldots, N_{TX}$ with sampling rates of Y on the links;

(A32) judging whether it is a single-user mode or a multiuser mode, executing step (A33) in the case of the single-user mode, and otherwise, executing step (A34) and step (A35);

(A33) generating the data fields, carrying out basic baseband signal processing, cyclic shift and space mapping on the data fields to obtain transmitted data on the transmission links, and respectively carrying out the IFFT and guard interval insertion operations on the transmitted data on the transmission links to form transmission sequences $S_{SU\_DATA}^{iTX}$, $i_{TX}=1, \ldots, N_{TX}$ with sampling rates of Y on the links;

(A34) generating SIG-B fields of users, respectively carrying out basic baseband signal processing on the SIG-B fields of the users, carrying out the CSD operation to map the SIG-B to space-time flows of the users, transmitting the space-time flows of all the users to the transmission links via the space mapping, and respectively carrying out the IFFT and guard interval insertion operations on the SIG-B on the transmission links to form transmission sequences $S_{MU\_SIG-B}^{iTX}$, $i_{TX}=1, \ldots, N_{TX}$ with sampling rates of Y on the links; and (A35) generating the data fields of users, respectively carrying out basic baseband signal processing and cyclic shift on the data fields of the users, thereafter combining the space-time flows generated by the users, obtaining the transmitted data on the transmission links via the space mapping, and respectively carrying out the IFFT and guard interval insertion operations on the transmitted data on the transmission links to form transmission sequences $S_{MU\_DATA}^{iTX}$, $i_{TX}=1, \ldots, N_{TX}$ with sampling rates of Y on the links.

A data reception method for a hybrid single-carrier modulation and OFDM carrier modulation MIMO system, used for receiving the data sent by the aforementioned data transmission method, includes the following steps:

(B1) sampling analog signals at a sampling rate of Y by a receiver;

(B2) carrying out upsampling and downsampling processing on single-carrier sequences obtained by sampling to obtain single-carrier reception sequences with sampling rates of X;

(B3) estimating a channel by using received data corresponding to channel estimation training fields, carrying out single-carrier demodulation to obtain configuration information of SIG-A, and configuring the receiver according to the configuration information of the SIG-A; and (B4) adopting received data corresponding to long training fields in OFDM symbol sequences to estimate an equivalent channel for OFDM-MIMO transmission, and carrying out OFDM demodulation to obtain transmitted data.

Specific steps of step (B2) include:

(B21) carrying out upsampling and pulse shaping operations on the single-carrier sequences to obtain sequences with sampling rates of Z, Z=[X,Y], wherein [X,Y] represents least common multiples of X and Y, $i_{TX}=1, \ldots, N_{TX}$; and (B22) carrying out Z/X multiple downsampling on the sequences obtained in step (B21) to obtain the single-carrier reception sequences with the sampling rates of X.

The specific steps of step (B3) include:

(B31) estimating the channel by using the received data corresponding to the channel estimation training fields by the receiver, when frequency domain estimation is adopted, carrying out guard interval removal and fast Fourier transform (FFT: Fast Fourier Transform) operations on the received data corresponding to the channel estimation training fields, then carrying out the channel estimation by adopting a channel estimation algorithm to obtain a frequency domain channel matrix, when time domain estimation is adopted, carrying out cross correlation operation on local channel estimation training fields and corresponding received data to obtain channel pulse response, and then carrying out the FFT operation to obtain the frequency domain channel matrix; and (B32) carrying out de-blocking, balancing and basic baseband signal processing on the SIG-A to obtain the configuration information of the SIG-A, and configuring the receiver according to the configuration information of the SIG-A.

The specific steps of step (B4) include:

(B41) judging whether a user mode indicated by the SIG-A is a single-user mode or a multiuser mode, executing step (B42) in the case of the single-user mode, and otherwise, executing step (B43) and step (B44);

(B42) carrying out the channel estimation via the received data corresponding to the long training fields by adopting the channel estimation algorithm to obtain the equivalent channel for the OFDM-MIMO transmission, and carrying out guard interval removal, balancing and basic baseband signal processing on the data to obtain the transmitted data;

(B43) carrying out the channel estimation by users via the received data corresponding to the long training fields according to the number and positions of space-time flows indicated by the SIG-A by adopting the channel estimation algorithm, so as to obtain the equivalent channel for the OFDM-MIMO transmission; and (B44) carrying out guard interval removal, balancing and basic baseband signal processing on SIG-B, configuring the receiver according to the SIG-B, and carrying out guard interval removal, balancing and basic baseband signal processing on the data fields to obtain the transmitted data.

A transmitter adopting the aforementioned data transmission method for the hybrid single-carrier modulation and OFDM carrier modulation MIMO system includes:

a single-carrier signal generator, used for generating single-carrier transmission sequences with sampling rates of X on transmission links of an MIMO transmission device, wherein the single-carrier transmission sequences include synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences include long training fields for estimating an equivalent channel for OFDM-MIMO transmission and data fields, and further include SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion.

A receiver adopting the data reception method for the hybrid single-carrier modulation and OFDM carrier modulation MIMO system includes:

a receiver radio frequency module, used for receiving data transmitted by a transmitter and outputting analog signals;

an analog-to-digital converter, used for sampling the analog signals at a sampling rate of Y to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

A hybrid single-carrier modulation and OFDM carrier modulation MIMO system includes a transmitter and a receiver, wherein the transmitter includes:

a single-carrier signal generator, used for generating single-carrier transmission sequences with sampling rates of X on transmission links of an MIMO transmission device, wherein the single-carrier transmission sequences include synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences include long training fields for estimating an equivalent channel for OFDM-MIMO transmission and data fields, and further include SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion;

the receiver includes:

a receiver radio frequency module, used for receiving data transmitted by the transmitter and outputting the analog signals;

an analog-to-digital converter, used for sampling the analog signals at the sampling rate of Y to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

Beneficial effects: compared with the prior art, the present invention provides a single-carrier and multi-carrier compatible hybrid carrier mechanism transmission mode applied to an MIMO communication system, which can reduce the interference between a single-carrier system and a multi-carrier system that work in the same frequency band, and thus the reliability of the communication system is improved.

DETAILED DESCRIPTION

The technology of the present invention can be applied to various bandwidth wireless communication systems, an implemented wireless node can include an access point or an access terminal, and an example of this communication system includes a millimeter wave wireless multiple input multiple output communication system, etc.

Operation steps of the present invention will be illustrated below in detail with hybrid carrier mechanism transmission under a millimeter wave wireless local area network (IEEE802.11aj) 540 MHz bandwidth as an example, wherein the single-carrier sampling rate is 440 MHz, the OFDM sampling rate is 660 MHz, the number of subcarriers is 256, the number of effective subcarriers is 179, the number of null subcarriers is 77, the 179 effective subcarriers include 8 pilot subcarriers, 3 DC subcarriers and 168 data subcarriers.

Figure 1:
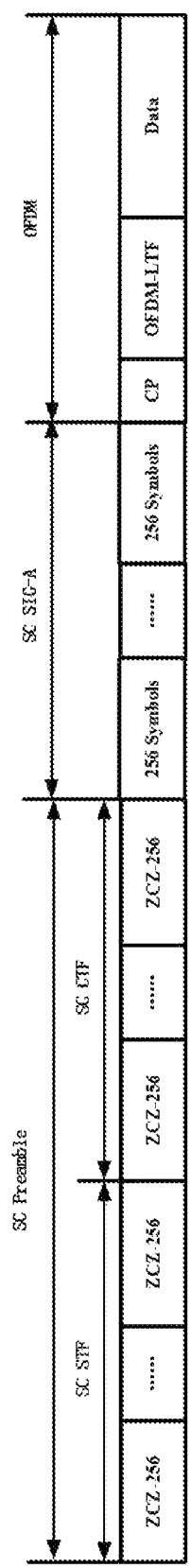
FIG. 1 is a schematic diagram of a single-user MIMO frame format in an embodiment of the present invention.

As shown in FIG. 1, a single-user MIMO frame structure, namely a structure of single-carrier preambles (referred to as SC Preamble), single-carrier signaling fields A (referred to as SCSIG-A) and OFDM fields, can include single-carrier synchronous training fields (referred to as SC STF), single-carrier channel estimation training fields (referred to as SC CTF), single-carrier signaling fields A (referred to as SC SIG-A), OFDM long training fields (referred to as OFDM-LTF) and OFDM data fields.

Figure 2:
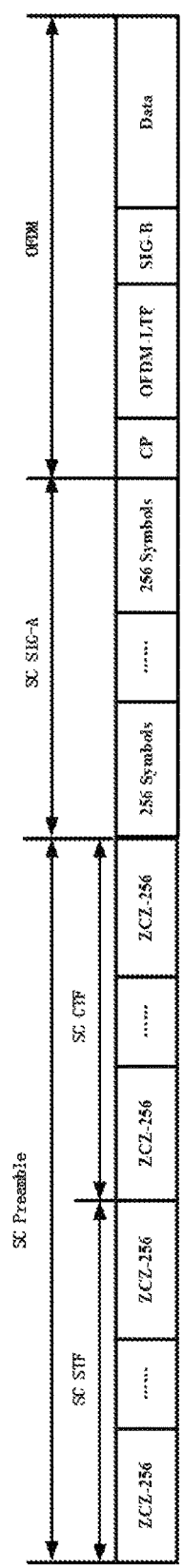
FIG. 2 is a schematic diagram of a multiuser MIMO frame format in an embodiment of the present invention.

As shown in FIG. 2, a multiuser MIMO frame structure, namely a structure of the single-carrier preambles (referred to as SC Preamble), the single-carrier signaling fields A (referred to as SCSIG-A) and the OFDM fields, can include the single-carrier synchronous training fields (referred to as SC STF), the single-carrier channel estimation training fields (referred to as SC CTF), the single-carrier signaling fields A (referred to as SC SIG-A), the OFDM long training fields (referred to as OFDM-LTF), the signaling fields B (referred to as SIG-B) and the data fields.

Figure 3:
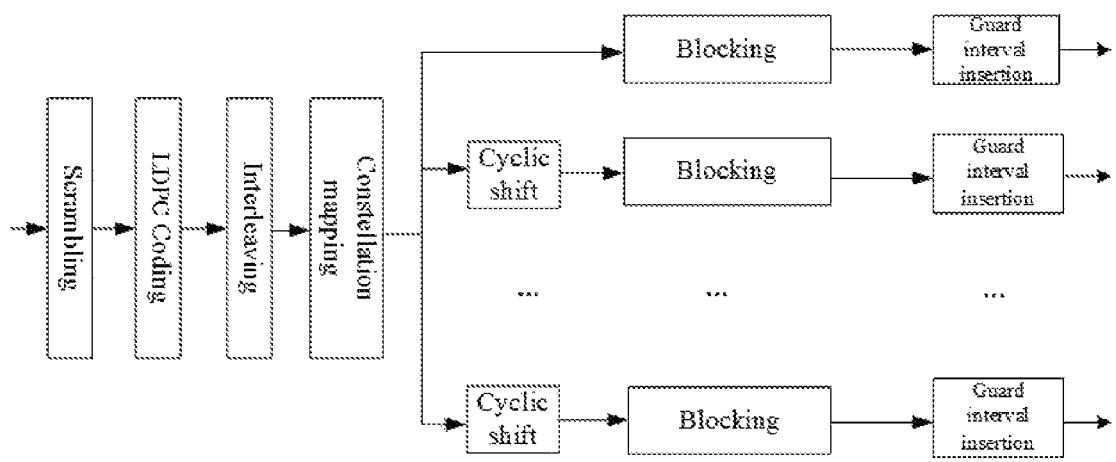
FIG. 3 is a block diagram of transmission of a signaling field A in an embodiment of the present invention.
Figure 4:
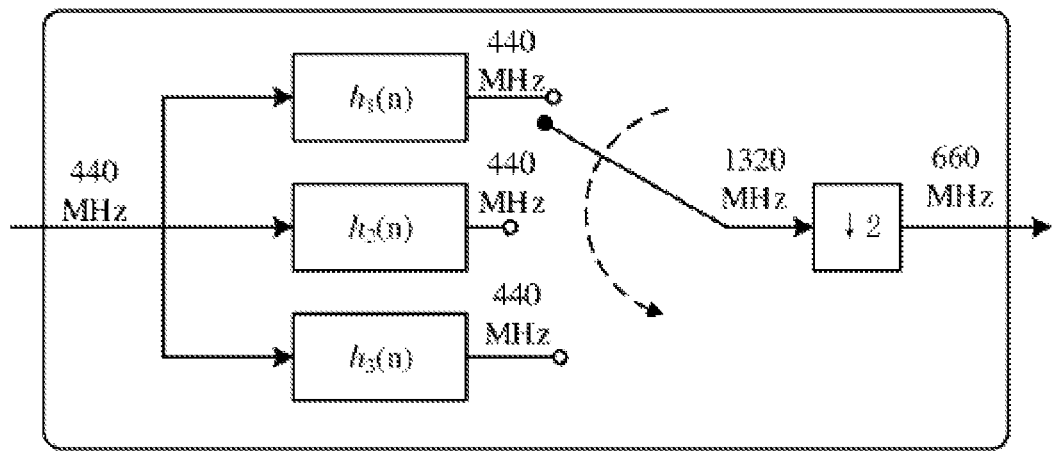
FIG. 4 is a block diagram of multiphase implementation of a shaping filter in an embodiment of the present invention.
Figure 5:
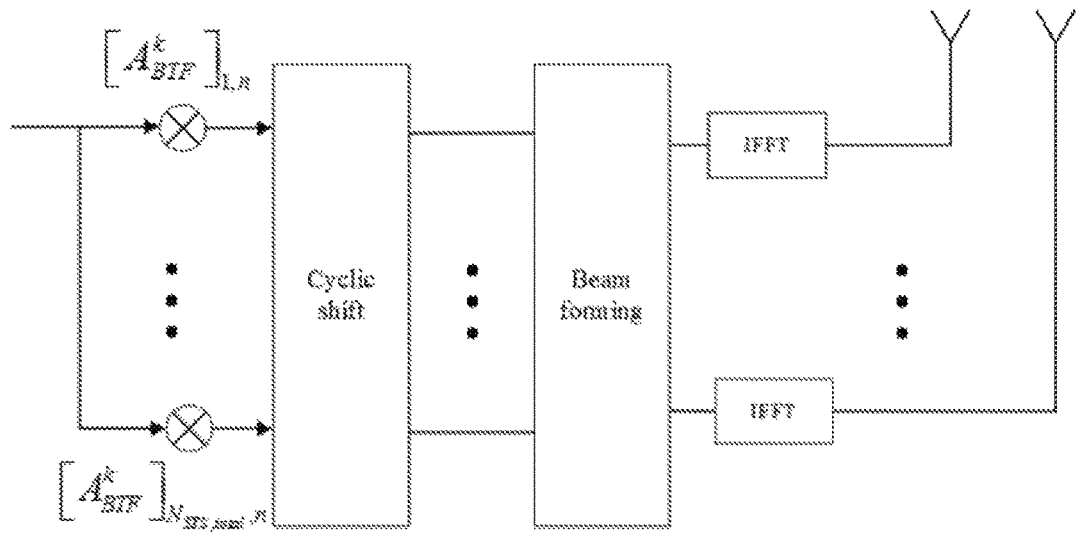
FIG. 5 is a schematic diagram of transmission of a long training field in an embodiment of the present invention.

With respect to the single-user MIMO frame structure and the multiuser MIMO frame structure mentioned above, a data transmission method for the hybrid single-carrier modulation and OFDM carrier modulation MIMO system includes the following steps:

step a1: generating synchronous training fields and channel estimation training fields on transmission links of an MIMO transmission device, wherein the sampling rate is 440 MHz;

step a2: configuring the fields of SIG-A according to the mode adopted for transmitted data, as shown in FIG. 3, carrying out scrambling, channel coding, interleaving and constellation mapping on the SIG-A, thereafter carrying out CSD operation to map the SIG-A to the transmission links, and respectively carrying out blocking and guard interval insertion operations on the SIG-A after the CSD on the transmission links, wherein the sampling rate is 440 MHz;

step a3: since the preambles and the SIG-A are transmitted in a single carrier mode and the rates of the signals are the same, directly merging the SIG-A behind the preambles;

step a4: forming a multiphase filter by the sequences obtained in step a3 via pulses as shown in FIG. 4, respectively forming three paths of the multiphase filter by 440 MHz symbol sequences via the pulses, wherein the output of each path is 440 MHz signals, sampling the signals of the paths via one selection switch, and raising the sampling rate of the signals to 1320 MHz, wherein the selection switch is generally implemented by a digital logic circuit, when a first symbol of the transmitted data is transmitted to a center tap of the first path of the pulse shaping multiphase filter, the output symbol is used as the first symbol after upsampling of the single-carrier filed, and this regulation can reduce the length of a transition area and is beneficial for the synchronization of a hardware system;

step a5: carrying out 2:1 downsampling on the symbol sequences obtained in step a4 to reduce the rate of the single-carrier symbols to the sampling rate of 660 MHz of the OFDM fields. To facilitate the implementation of synchronization, one optional solution is to store the data in step a4 in one buffer area at first and then output one symbol after the interval of every symbol according to the first-in first-out principle;

step a6: generating long training fields of an equivalent channel for estimating OFDM-MIMO transmission, wherein the lengths of the long training fields are determined by the number of space-time flows, defining sequences in the frequency domain and one orthogonal mapping matrix to generate long training fields corresponding to the number of space data flows, and transmitting the long training fields to transmission links by space mapping, wherein the block diagram of generation of OFDM symbols of the long training fields is as shown in FIG. 5, the coefficient $[A_{LTF}^k]_{m,n}$ represents an element of the matrix in the $m^{th}$ row and $n^{th}$ column of the orthogonal mapping matrix at the $k^{th}$ subcarrier, when 4 space-time flows are transmitted, the orthogonal mapping matrix is $$P_{LTF} = \begin{pmatrix} 1 & -1 & 1 & 1 \\ 1 & 1 & -1 & 1 \\ 1 & 1 & 1 & -1 \\ -1 & 1 & 1 & 1 \end{pmatrix} \quad \text{(formula 1)}$$

If the $k^{th}$ subcarrier is the pilot subcarrier, the value of the coefficient $[A_{LTF}^k]_{m,n}$ is:

$$[A_{LTF}^k]_{m,n}=[P_{LTF}]_{1,n} \quad \text{(formula 2)}$$

Figure 6:
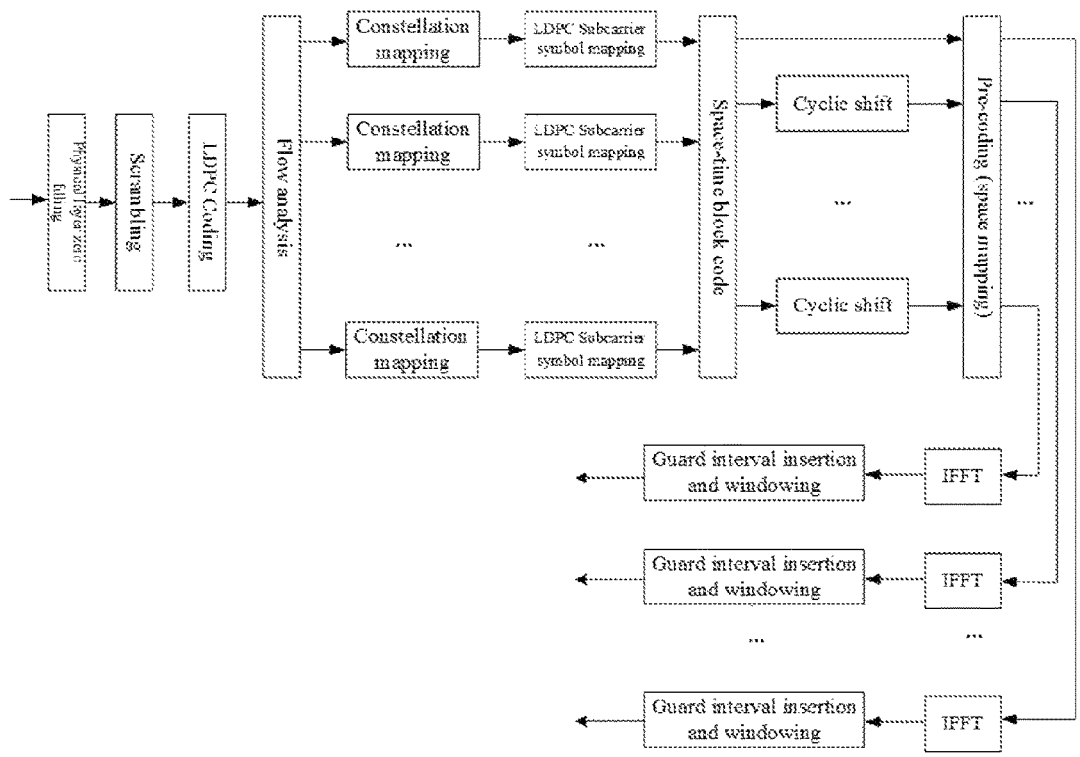
FIG. 6 is a block diagram of transmission of a single-user data field in an embodiment of the present invention.
Figure 7:
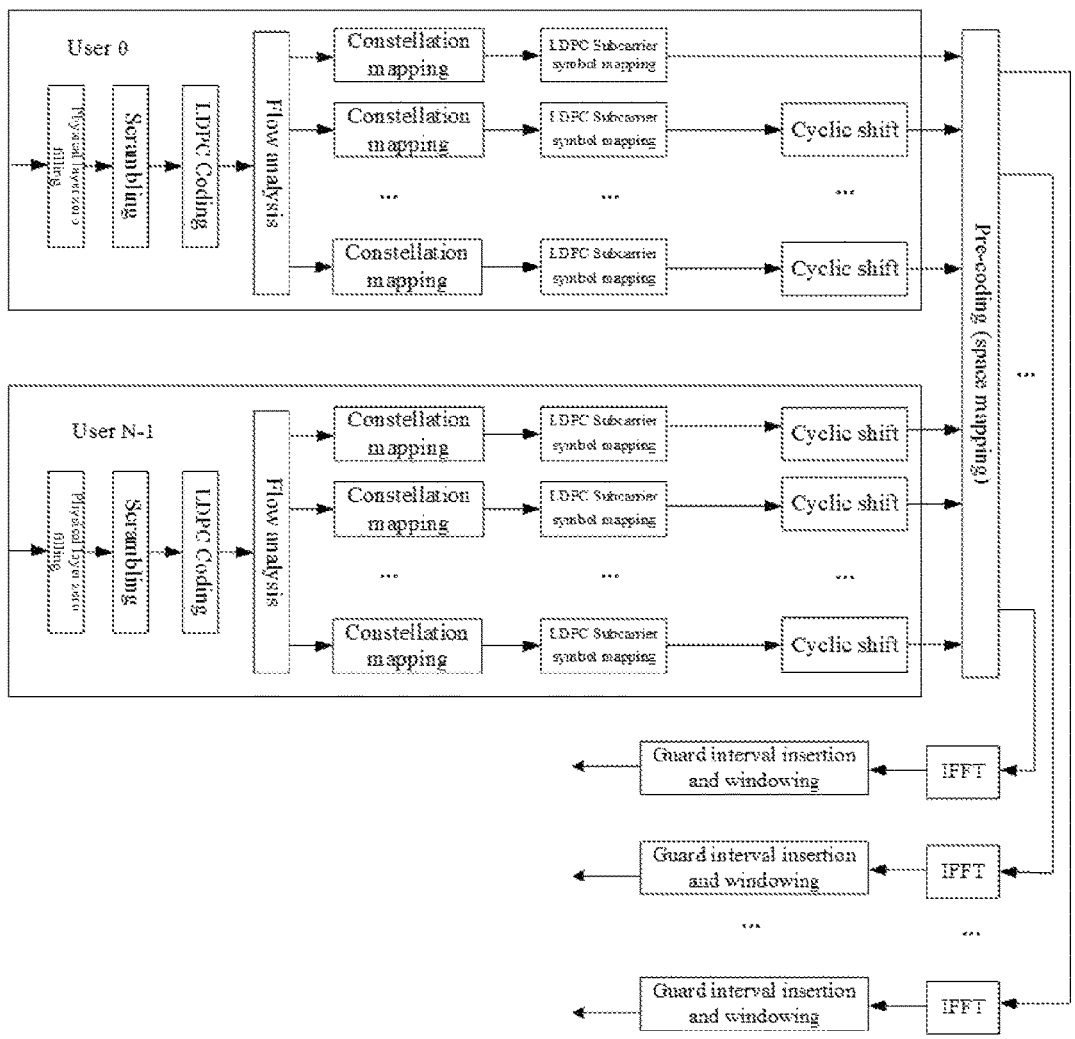
FIG. 7 is a block diagram of transmission of a multiuser data field in an embodiment of the present invention.

If the $k^{th}$ subcarrier is the data subcarrier, the value of the coefficient $[A_{LTF}^k]_{m,n}$ is:

$$[A_{LTF}^k]_{m,n}=[P_{LTF}]_{m,n} \quad \text{(formula 3)}$$

respectively carrying out IFFT and guard interval insertion operations on the long training fields on the transmission links to form transmission sequences;

step a7: if the transmitted data is a single-user data frame, executing step a8; if the transmitted data is a multiuser data frame, executing step a9 and step a10;

step a8: as shown in FIG. 6, with respect to a single-user MIMO mode, carrying out physical layer zero filling, scrambling, channel coding, flow analysis, constellation mapping, low-density parity check code subcarrier mapping, space-time block coding, cyclic shift and space mapping on the data to obtain the transmitted data on the transmission links, wherein the space mapping is the same as the space mapping in step a6, and then respectively carrying out IFFT and guard interval insertion operations on the transmitted data on the transmission links to form the transmission sequences on the links;

step a9: generating SIG-B fields of users, respectively carrying out scrambling, channel coding, constellation mapping, low-density parity check code subcarrier mapping and CSD operation on the SIG-B fields of the users to map the SIG-B to the space-time flows of the users, transmitting the space-time flows of all the users to the transmission links via the space mapping, and respectively carrying out the IFFT and guard interval insertion operations on the SIG-B on the transmission links to form the transmission sequences on the links;

step a10: as shown in FIG. 7, with respect to a multiuser MIMO mode, independently carrying out physical layer zero filling, scrambling, channel coding, flow analysis, constellation mapping, low-density parity check code subcarrier mapping and cyclic shift on the data fields of all the users, combining the space-time flows generated by the users, obtaining the transmitted data on the transmission links via the space mapping, and then respectively carrying out the IFFT and guard interval insertion operations on the transmitted data on the transmission links to form the transmission sequences on the links; and step a11: merging the transmission sequences after the single-carrier modulation and the transmission sequences after the OFDM carrier modulation on the links, and sending the transmission sequences via a digital-to-analog converter and a radio frequency module.

Figure 8:
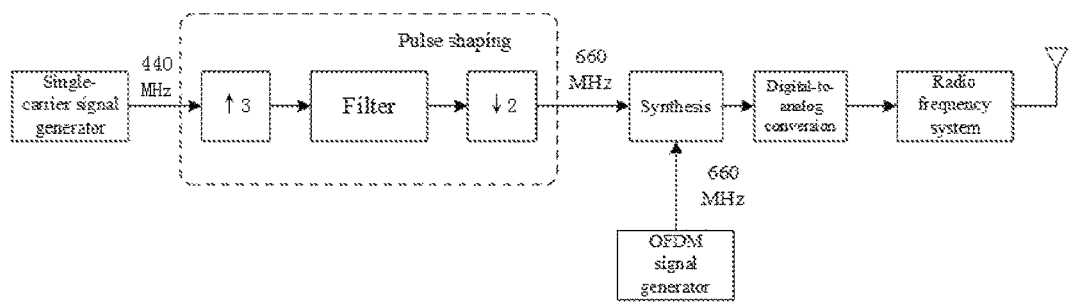
FIG. 8 is a block diagram of transmission on one transmission link in an embodiment of the present invention.
Figure 9:
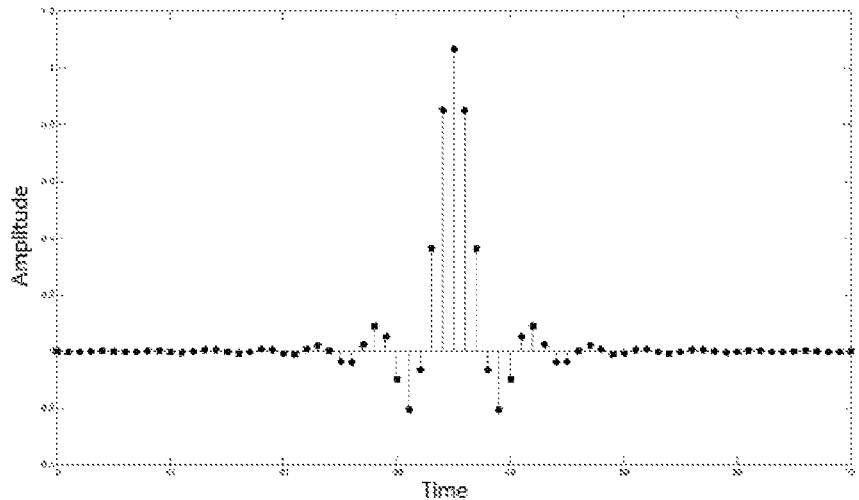
FIG. 9 is a time domain response diagram of a pulse shaping function in an embodiment of the present invention.
Figure 10:
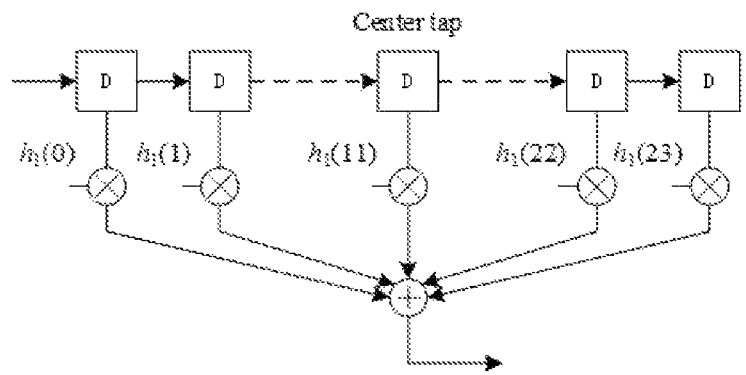
FIG. 10 is a structural diagram of a first path of a multiphase filter in an embodiment of the present invention, wherein $h_1$ (11) corresponds to a center tap.

A block diagram of transmission on an antenna link is as shown in FIG. 8, wherein upsampling and downsampling operations of the single-carrier transmission sequence are implemented by the pulse shaping multiphase filter, and each path of the pulse shaping multiphase filter includes multiple taps, tap coefficients are marked as $h_i(n)$, which represents the $n^{th}$ tap coefficient of the $i^{th}$ (i=1, 2, 3) path of the pulse shaping multiphase filter. The design steps are as follows:

step 101: a power spectrum density of the signals in a multicarrier modulation transmission mode is determined, and a continuous pulse shaping function h(t) is selected to make the power spectrum density of single-carrier signals be similar to the power spectrum density in OFDM modulation;

step 102: a limited time interval of h(t) is intercepted, and the continuous pulse shaping function h(t)) is sampled by using the sampling rate after the single-carrier upsampling to obtain a discrete pulse shaping multiphase filter, wherein the coefficients of the filter $h_{fix}$ (n) are:

[1, −6, −5, 3, 8, 0, −8, −4, 6, 8, −4, −13, −, 2, 16, 14, −9, −23, −4, 23, 15, −20, −27, 20, 57, 4, −99, −102, 70, 247, 144, −264, −558, −175, 991, 2327, 2917, 2327, 991, −175, −558, −264, 144, 247, 70, −102, −99, 4, 57, 20, −27, −20, 15, 23, −4, −23, −9, 14, 16, −2, −13, −4, 8, 6, −4, −8, 0, 8, 3, −5, −6, 1], the order of the filter is 70, the roll-off coefficient is 0.25, to guarantee the same symbol power before and after the filtering, the normalization factor is $$h(n) = \frac{\sqrt{3}\, h_{fix}(n)}{\sqrt{\sum_{l=0}^{70} |h_{fix}(l)|^2}},$$

and the coefficients of the filter are as shown in FIG. 9;

step 103: the coefficient of the pulse shaping multiphase filter with a length of 71 can be obtained through step 102. A multiphase implementation structure is adopted, and the pulse shaping multiphase filter is decomposed into 3 paths of multiphase filters. Each path requires $$m = \left\lceil \frac{71}{3} \right\rceil = 24$$

tap coefficients;

step 104: the sampling position corresponding to the peak value of the coefficients of the pulse shaping multiphase filter h(n) is $n_0$=35. The coefficient of the center tap of the first path of the pulse shaping multiphase filter is $h(n_0)$ Correspondingly, $h(n_0+1)$, $h(n_0+2)$ respectively correspond to the coefficients of the center taps of the second path and the third path;

step 105: the center taps of the paths of the pulse shaping multiphase filter are found out in step 104. The tap coefficients of other positions can be determined according to the tap coefficient of the central position, with the first path of pulse shaping multiphase filter as an example, the coefficient $h_1$ (n) can be given by the following formula:

$$h_1(n) = h\!\left(n_0 - 3 \times \left\lfloor \frac{n_0}{3} \right\rfloor + 3n\right) \quad \text{(formula 4)}$$

the structure of the generated first path of filter is as shown in FIG. 10; and similarly, the second path and the third path of filters are respectively determined by the following formulas:

$$h_2(n) = h\!\left(n_0 + 1 - 3 \times \left\lfloor \frac{n_0+1}{3} \right\rfloor + 3n\right) \quad \text{(formula 5)}$$

$$h_3(n) = h\!\left(n_0 + 2 - 3 \times \left\lfloor \frac{n_0+2}{3} \right\rfloor + 3n\right) \quad \text{(formula 6)}$$

wherein, the value range of n is 0≤n≤m−1, and when i>70, h(i)=0.

Figure 11:
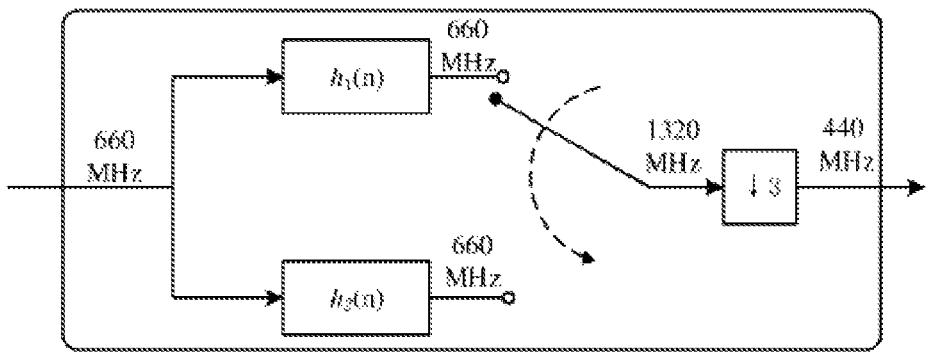
FIG. 11 is a block diagram of multiphase implementation of a matching filter in an embodiment of the present invention.

A data frame processing method will be illustrated below in detail with the reception of a frame of data of the hybrid single-carrier modulation and OFDM carrier modulation MIMO system under the millimeter wave wireless local area network (IEEE802.11aj) 540 MHz bandwidth as an example. The data frame processing method includes the following steps:

step b1: sampling analog signals by a receiving end analog-to-digital converter at the sampling rate of 660 MHz of OFDM;

step b2: sampling a permeable sequence and the SIG-A by the matching multiphase filter as shown in FIG. 11, sampling 660 MHz baseband signals by two paths of the matching multiphase filter respectively, wherein the output of each path is 660 MHz signals, sampling the signals of the paths via one selection switch, and raising the sampling rate of the signals to 1320 MHz;

step b3: storing the sequence after the upsampling of 1320 MHz in one buffer area, wherein the reception sequence $$r\!\left(\frac{n}{3} T_c\right),$$

$T_c$ is a reciprocal of the single-carrier sampling rate and can be decomposed into three 440 MHz reception sequences, which are respectively $r(nT_c)$, $$r\!\left(\frac{3n+1}{3} T_c\right) \text{ and } r\!\left(\frac{3n+2}{3} T_c\right),$$

correlating the reception sequences with local synchronous training fields, and selecting the sequence having the highest correlation peak to serve as the 440 MHz reception sequence obtained by downsampling;

step b4: carrying out channel estimation by the receiver by using received data corresponding to the channel estimation training fields at a single-carrier symbol rate of 440 MHz, when frequency domain estimation is adopted, carrying out guard interval removal and FFT operations on the received data corresponding to the channel estimation training fields, then carrying out estimation to obtain a frequency domain channel matrix, when time domain estimation is adopted, carrying out the FFT operation to obtain the frequency domain channel matrix after estimating the channel pulse response;

step b5: carrying out de-blocking, balancing, demodulation, de-interleaving, channel decoding, descrambling and CRC check to obtain the configuration information of the SIG-A, configuring the receiver according to the configuration information of the SIG-A, for example, the multiuser mode/single-user mode, a coding modulation solution and the like, if the SIG-A indicates the single-user MIMO mode, executing step b6, otherwise, the SIG-A indicates the multiuser MIMO mode, and executing step b7 and step b8;

step b6: estimating an equivalent channel for estimating OFDM-MIMO transmission by using the received data corresponding to the long training sequence, and carrying out guard interval removal, balancing, low-density parity check code subcarrier de-mapping, demodulation, flow analysis removal, channel decoding, descrambling and de-stuffing operations on the data to obtain transmitted data;

step b7: estimating equivalent channel matrixes by users by adopting the received data corresponding to the long training sequence fields according to the number and positions of the space-time flows indicated by the SIG-A; and step b8: carrying out guard interval removal, balancing, low-density parity check code subcarrier de-mapping, demodulation, channel decoding and descrambling operations on the SIG-B, configuring the receiver according to the SIG-B, and carrying out guard interval removal, balancing, low-density parity check code subcarrier de-mapping, demodulation, flow analysis removal, channel decoding, descrambling and de-stuffing operations on the data fields to obtain the transmitted data.

A receiving end matching multiphase filter contains two paths, each path has a plurality of tap coefficients $h_i(n)$, and $h_i(n)$ represents the coefficient of the $n^{th}$ tap of the $i(i=1,2)^{th}$ path of the matching multiphase filter. The receiving end matching multiphase filter can use the same coefficients as the pulse shaping filter of the transmitting end, and the design of the receiving end matching multiphase filter will be illustrated with the same filter coefficient as an example:

step 201: the number of taps of the paths of the matching multiphase filter is determined, $$m = \left\lceil \frac{71}{2} \right\rceil = 36;$$

step 202: the sampling position corresponding to the peak value of the filter coefficient is $n_0=35$, the coefficient corresponding to the center tap of the first path of the matching multiphase filter is $h(n_0)$, and correspondingly, the coefficient corresponding to the center tap of the second path is $h(n_0+1)$; and step 203: the tap coefficients of other paths of the matching multiphase filter can be determined according to the coefficient of the center tap in accordance with the following formulas:

$$h_1(n) = h\left(n_0 - 2 \times \left\lfloor \frac{n_0}{2} \right\rfloor + 2n\right) \quad \text{(formula 7)}$$

$$h_2(n) = h\left(n_0 + 1 - 2 \times \left\lfloor \frac{n_0+1}{2} \right\rfloor + 2n\right) \quad \text{(formula 8)}$$

wherein, the value range of n is $0 \le i \le m-1$, and when $i>70$, $h(i)=0$.

The embodiment of the present invention further provides a hybrid single-carrier modulation and OFDM carrier modulation MIMO system, including a transmitter and a receiver, the transmitter includes a single-carrier signal generator, an OFDM signal generator, a pulse shaping multiphase filter, a digital-to-analog converter and a transmitter radio frequency module, wherein the single-carrier signal generator is used for generating single-carrier transmission sequences with sampling rates of X on transmission links of an MIMO transmission device, the single-carrier signal generator includes a preamble processing unit and an SIG-A processing unit, the preamble processing unit is used for generating synchronous training fields and channel estimation training fields on the transmission links, and the SIG-A processing unit is used for generating SIG-A fields, carrying out single-carrier modulation on the SIG-A fields and mapping the SIG-A fields to the transmission links;

the OFDM signal generator is used for generating OFDM carrier transmission sequences with sampling rates of Y on the transmission links of the MIMO transmission device, the OFDM signal generator includes a long training field processing unit, a data processing unit and an SIG-B processing unit, the long training field processing unit is used for generating long training fields for estimating an equivalent channel for OFDM-MIMO transmission and mapping the long training fields to the transmission links via space mapping, the data processing unit is used for generating data fields, carrying out OFDM modulation on the data fields and mapping the data fields to the transmission links, and the SIG-B processing unit is used for generating SIG-B fields in a multiuser mode, carrying out OFDM modulation on the SIG-B fields and mapping the SIG-B fields to the transmission links;

the pulse shaping multiphase filter is used for carrying out upsampling and downsampling processing on single-carrier transmission symbol sequences to form single-carrier transmission sequences with sampling rates of Y;

the digital-to-analog converter is used for carrying out digital-to-analog conversion on the single-carrier transmission sequences and the OFDM carrier transmission sequences; and the transmitter radio frequency module is used for transmitting analog signals after the digital-to-analog conversion;

the receiver includes:

a receiver radio frequency module, used for receiving data transmitted by the transmitter and outputting the analog signals;

an analog-to-digital converter, used for sampling the analog signals at the sampling rate of F to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

The invention claimed is:

1. A data transmission method for a hybrid single-carrier modulation and OFDM carrier modulation MIMO system, comprising the following steps:
   (A1) generating single-carrier transmission sequences with sampling rates of X on transmission links of an MIMO transmission device;
   (A2) carrying out upsampling and downsampling processing on single-carrier transmission symbol sequences on the transmission links to form single-carrier transmission sequences with sampling rates of Y;
   (A3) generating OFDM carrier transmission sequences with sampling rates of Y on the transmission links of the MIMO transmission device; and
   (A4) synthesizing the transmission sequences in steps (A2) and (A3) on the transmission links, carrying out digital-to-analog conversion, and transmitting the synthesized transmission sequence via a radio frequency module;
   wherein the single-carrier transmission sequences in step (A1) comprise synchronous training fields, channel estimation training fields and signaling fields SIG-A;
   wherein the OFDM carrier transmission sequences in step (A3) comprise long training fields for estimating an equivalent channel for OFDM-MIMO transmission and data fields, and further comprise signaling fields SIG-B between the long training fields and the data fields in a multiuser mode; and wherein the specific steps of step (A1), generating the single-carrier transmission sequences with the sampling rates of X on the transmission links of the MIMO transmission device, comprise:
- (A11) generating the synchronous training fields and the channel estimation training fields on the $i_{TX}^{th}$ transmission link MIMO transmission device, $S^{i_{Tx}}_{preamble}$, $i_{TX}=1, \ldots, N_{TX}$, $N_{TX}$ represents a number of transmission antennas; and
- (A12) generating the SIG-A fields, carrying out basic baseband signal processing on the SIG-A, then carrying out cyclic shift diversity (CSD) operation to map the SIG-A to the transmission links, respectively carrying out blocking and guard interval insertion operations on the SIG-A after the CSD on the transmission links, and merging the channel estimation training fields of the links to obtain the sequences $S^{i_{Tx}}_{preamble+SIG-A}$, $i_{TX}=1, \ldots, N_{TX}$;

the specific steps of step (A2), carrying out the upsampling and downsampling processing on the single-carrier transmission symbol sequences on the transmission links to form the single-carrier transmission sequences with the sampling rates of Y, comprise:
- (A21) carrying out upsampling and pulse shaping operations on the $S_{preamble+SIG-A}^{i_{Tx}}$ generated in step (A12) by adopting a pulse shaping multiphase filter to obtain sequences $\tilde{S}_{preamble+SIG-A}^{i_{Tx}}$ with sampling rates of Z, Z=[X,Y], wherein [X,Y] represents least common multiples of X and Y, $i_{TX}=1, \ldots, N_{TX}$; and
- (A22) carrying out Z/Y multiple downsampling on the $\tilde{S}_{preamble+SIG-A}^{i_{Tx}}$ obtained in step (A21) to obtain the single-carrier transmission sequences $S_{sc}^{i_{Tx}}$, $i_{TX}=1, \ldots, N_{TX}$ with the sampling rates of Y.

2. The data transmission method for the hybrid single-carrier modulation and OFDM carrier modulation MIMO system of claim 1, wherein the specific steps of step (A3), generating the OFDM carrier transmission sequences with the sampling rates of Y on the transmission links of the MIMO transmission device, comprise:
- (A31) generating the long training fields for estimating the equivalent channel for the OFDM-MIMO transmission, transmitting the long training fields to the transmission links by a space mapping operation, and respectively carrying out inverse fast Fourier transform IFFT and guard interval insertion operations on the long training fields on the transmission links to form transmission sequences $S_{LTF}^{i_{Tx}}$, $i_{TX}=1, \ldots, N_{TX}$ on the links;
- (A32) judging whether it is a single-user mode or a multiuser mode, executing step (A33) in the case of the single-user mode, and otherwise, executing step (A34) and step (A35);
- (A33) generating the data fields, carrying out basic baseband signal processing, cyclic shift and space mapping on the data fields to obtain transmitted data on the transmission links, and respectively carrying out the IFFT and guard interval insertion operations on the transmitted data on the transmission links to form transmission sequences $S_{SU\_DATA}^{i_{Tx}}$, $i_{TX}=1, \ldots, N_{TX}$ on the links;
- (A34) generating SIG-B fields of users, respectively carrying out basic baseband signal processing on the SIG-B fields of the users, carrying out the CSD operation to map the SIG-B to space-time flows of the users, transmitting the space-time flows of all the users to the transmission links via the space mapping, and respectively carrying out the IFFT and guard interval insertion operations on the SIG-B on the transmission links to form transmission sequences $S_{MU\_SIG-B}^{i_{Tx}}$, $i_{TX}=1, \ldots, N_{TX}$ on the links; and
- (A35) generating the data fields of the users, respectively carrying out basic baseband signal processing and cyclic shift on the data fields of the users, thereafter combining the space-time flows generated by the users, obtaining the transmitted data on the transmission links via the space mapping, and respectively carrying out the IFFT and guard interval insertion operations on the transmitted data on the transmission links to form transmission sequences $S_{MU\_DATA}^{i_{Tx}}$, $i_{TX}=1, \ldots, N_{TX}$ on the links.

3. A transmitter adopting the data transmission method for the hybrid single-carrier modulation and OFDM carrier modulation MIMO system of claim 2, comprising:
- a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;
- an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;
- a pulse shaping multiphase filter, used for carrying out upsampling and downsampling processing on single-carrier transmission symbol sequences to form single-carrier transmission sequences with sampling rates of Y;
- a digital-to-analog converter, used for carrying out digital-to-analog conversion on the single-carrier transmission sequences and the OFDM carrier transmission sequences; and
- a transmitter radio frequency module, used for transmitting analog signals after the digital-to-analog conversion.

4. A data reception method for a hybrid single-carrier modulation and OFDM carrier modulation MIMO system, used for receiving the data sent by the data transmission method of claim 1, comprising the following steps:
- (B1) sampling analog signals at a sampling rate of Y by a receiver;
- (B2) carrying out upsampling and downsampling processing on single-carrier sequences obtained by sampling to obtain single-carrier reception sequences with sampling rates of X;
- (B3) estimating a channel by using received data corresponding to channel estimation training fields, carrying out single-carrier demodulation to obtain configuration information of SIG-A, and configuring the receiver according to the configuration information of the SIG-A; and
- (B4) adopting received data corresponding to long training fields in OFDM symbol sequences to estimate an equivalent channel for OFDM-MIMO transmission, and carrying out OFDM demodulation to obtain transmitted data.

5. The data reception method for the hybrid single-carrier modulation and OFDM carrier modulation MIMO system of claim 4, wherein the specific steps of step (B2), carrying out the upsampling and downsampling processing on the single-carrier sequences obtained by sampling to obtain the single-carrier reception sequences with sampling rates of X, comprise:
- (B21) carrying out upsampling and pulse shaping operations on the single-carrier sequences to obtain sequences with sampling rates of Z, Z=[X,Y], wherein [X,Y] represents least common multiples of X and Y, $i_{TX}=1, \ldots, N_{TX}$; and
- (B22) carrying out Z/X multiple downsampling on the sequences obtained in step (B21) to obtain the single-carrier reception sequences with the sampling rates of X;

the specific steps of step (B3), estimating the channel by using the received data corresponding to the channel estimation training fields, carrying out the single-carrier demodulation to obtain the configuration information of the SIG-A, and configuring the receiver according to the configuration information of the SIG-A, comprise:
- (B31) estimating the channel by using the received data corresponding to the channel estimation training fields by the receiver, when frequency domain estimation is adopted, carrying out guard interval removal and fast Fourier transform FFT operations on the received data corresponding to the channel estimation training fields, then carrying out channel estimation by adopting a channel estimation algorithm to obtain a frequency domain channel matrix, when time domain estimation is adopted, carrying out cross correlation operation on local channel estimation training fields and corresponding received data to obtain channel pulse response, and then carrying out the FFT operation to obtain the frequency domain channel matrix; and
- (B32) carrying out de-blocking, balancing and basic baseband signal processing on the SIG-A to obtain the configuration information of the SIG-A, and configuring the receiver according to the configuration information of the SIG-A.

6. A receiver adopting the data reception method for the hybrid single-carrier modulation and OFDM carrier modulation MIMO system of claim 5, comprising:
- a receiver radio frequency module, used for receiving data transmitted by a transmitter and outputting analog signals;
- an analog-to-digital converter, used for sampling the analog signals at a sampling rate of Y to obtain symbol sequences with sampling rates of Y;
- a matching multiphase filter, used for carrying out upsampling and downsampling processing on single-carrier sequences to obtain single-carrier reception sequences with sampling rates of X;
- a single-carrier signal demodulation module, used for carrying out channel estimation and demodulating the single-carrier reception sequences to obtain configuration information of SIG-A, and configuring the receiver according to the configuration information of the SIG-A; and
- an OFDM signal demodulation module, used for carrying out OFDM-MIMO channel estimation and demodulating OFDM reception sequences to obtain transmitted data.

7. The data reception method for the hybrid single-carrier modulation and OFDM carrier modulation MIMO system of claim 4, wherein the specific steps of step (B4), adopting the received data corresponding to the long training fields in the OFDM symbol sequences to estimate the equivalent channel for the OFDM-MIMO transmission, and carrying out the OFDM demodulation to obtain the transmitted data, comprise:
- (B41) judging whether a user mode indicated by the SIG-A is a single-user mode or a multiuser mode, executing step (B42) in the case of the single-user mode, and otherwise, executing step (B43) and step (B44);
- (B42) carrying out the channel estimation via the received data corresponding to the long training fields by adopting the channel estimation algorithm to obtain the equivalent channel for the OFDM-MIMO transmission, and carrying out guard interval removal, balancing and basic baseband signal processing on the data to obtain the transmitted data;
- (B43) carrying out the channel estimation by users via the received data corresponding to the long training fields according to a number and positions of space-time flows indicated by the SIG-A by adopting the channel estimation algorithm, so as to obtain the equivalent channel for the OFDM-MIMO transmission; and
- (B44) carrying out guard interval removal, balancing and basic baseband signal processing on SIG-B, configuring the receiver according to the SIG-B, and carrying out guard interval removal, balancing and basic baseband signal processing on the data fields to obtain the transmitted data.

8. A receiver adopting the data reception method for the hybrid single-carrier modulation and OFDM carrier modulation MIMO system of claim 7, comprising:
- a receiver radio frequency module, used for receiving data transmitted by a transmitter and outputting analog signals;
- an analog-to-digital converter, used for sampling the analog signals at a sampling rate of Y to obtain symbol sequences with sampling rates of Y;
- a matching multiphase filter, used for carrying out upsampling and downsampling processing on single-carrier sequences to obtain single-carrier reception sequences with sampling rates of X;
- a single-carrier signal demodulation module, used for carrying out channel estimation and demodulating the single-carrier reception sequences to obtain configuration information of SIG-A, and configuring the receiver according to the configuration information of the SIG-A; and
- an OFDM signal demodulation module, used for carrying out OFDM-MIMO channel estimation and demodulating OFDM reception sequences to obtain transmitted data.

9. A receiver adopting the data reception method for the hybrid single-carrier modulation and OFDM carrier modulation MIMO system of claim 4, comprising:
- a receiver radio frequency module, used for receiving data transmitted by a transmitter and outputting analog signals;
- an analog-to-digital converter, used for sampling the analog signals at a sampling rate of Y to obtain symbol sequences with sampling rates of Y;
- a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

10. A hybrid single-carrier modulation and OFDM carrier modulation MIMO system, comprising a transmitter and a receiver adopting the data reception method for the hybrid single-carrier modulation and OFDM carrier modulation MIMO system of claim 4, wherein:

the transmitter comprises:

a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion;

the receiver comprises:

a receiver radio frequency module, used for receiving data transmitted by the transmitter and outputting the analog signals;

an analog-to-digital converter, used for sampling the analog signals at the sampling rate of Y to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

11. A transmitter adopting the data transmission method for the hybrid single-carrier modulation and OFDM carrier modulation MIMO system of claim 1, comprising:

a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion.

12. A hybrid single-carrier modulation and OFDM carrier modulation MIMO system, comprising a transmitter adopting the data transmission method for the hybrid single-carrier modulation and OFDM carrier modulation MIMO system of claim 1, and a receiver, wherein:

the transmitter comprises:

a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion;

the receiver comprises:

a receiver radio frequency module, used for receiving data transmitted by the transmitter and outputting the analog signals;

an analog-to-digital converter, used for sampling the analog signals at the sampling rate of Y to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

13. A transmitter adopting the data transmission method for the hybrid single-carrier modulation and OFDM carrier modulation MIMO system of claim 1, comprising:

a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion.

14. A data transmission method for a hybrid single-carrier modulation and OFDM carrier modulation MIMO system, comprising the following steps:

(A1) generating single-carrier transmission sequences with sampling rates of X on transmission links of an MIMO transmission device;

(A2) carrying out upsampling and downsampling processing on single-carrier transmission symbol sequences on the transmission links to form single-carrier transmission sequences with sampling rates of Y;

(A3) generating OFDM carrier transmission sequences with sampling rates of Y on the transmission links of the MIMO transmission device; and (A4) synthesizing the transmission sequences in steps (A2) and (A3) on the transmission links, carrying out digital-to-analog conversion, and transmitting the synthesized transmission sequence via a radio frequency module;

wherein the single-carrier transmission sequences in step (A1) comprise synchronous training fields, channel estimation training fields and signaling fields SIG-A;

wherein the OFDM carrier transmission sequences in step (A3) comprise long training fields for estimating an equivalent channel for OFDM-MIMO transmission and data fields, and further comprise signaling fields SIG-B between the long training fields and the data fields in a multiuser mode; and wherein the specific steps of step (A3), generating the OFDM carrier transmission sequences with the sampling rates of Y on the transmission links of the MIMO transmission device, comprise:

(A31) generating the long training fields for estimating the equivalent channel for the OFDM-MIMO transmission, transmitting the long training fields to the transmission links by a space mapping operation, and respectively carrying out inverse fast Fourier transform IFFT and guard interval insertion operations on the long training fields on the transmission links to form transmission sequences $S_{LTF}^{iTX}$, $i_{TX}=1, \ldots, N_{TX}$ on the links;

(A32) judging whether it is a single-user mode or a multiuser mode, executing step (A33) in the case of the single-user mode, and otherwise, executing step (A34) and step (A35);

(A33) generating the data fields, carrying out basic baseband signal processing, cyclic shift and space mapping on the data fields to obtain transmitted data on the transmission links, and respectively carrying out the IFFT and guard interval insertion operations on the transmitted data on the transmission links to form transmission sequences $S_{SU\_DATA}^{iTX}$, $i_{TX}=1, \ldots, N_{TX}$ on the links;

(A34) generating SIG-B fields of users, respectively carrying out basic baseband signal processing on the SIG-B fields of the users, carrying out cyclic shift diversity (CSD) operation to map the SIG-B to space-time flows of the users, transmitting the space-time flows of all the users to the transmission links via the space mapping, and respectively carrying out the IFFT and guard interval insertion operations on the SIG-B on the transmission links to form transmission sequences $S_{MU\_SIG-B}^{iTX}$, $i_{TX}=1, \ldots, N_{TX}$ on the links; and (A35) generating the data fields of the users, respectively carrying out basic baseband signal processing and cyclic shift on the data fields of the users, thereafter combining the space-time flows generated by the users, obtaining the transmitted data on the transmission links via the space mapping, and respectively carrying out the IFFT and guard interval insertion operations on the transmitted data on the transmission links to form transmission sequences $S_{MU\_DATA}^{iTX}$, $i_{TX}=1, \ldots, N_{TX}$ on the links.

15. A hybrid single-carrier modulation and OFDM carrier modulation MIMO system, comprising a transmitter adopting the data transmission method for the hybrid single-carrier modulation and OFDM carrier modulation MIMO system of claim 14, and a receiver, wherein:

the transmitter comprises:

a single-carrier signal generator, used for generating single-carrier transmission sequences with sampling rates of X on transmission links of an MIMO transmission device, wherein the single-carrier transmission sequences comprise synchronous training fields, channel estimation training fields and SIG-A fields;

an OFDM signal generator, used for generating OFDM carrier transmission sequences with sampling rates of Y on the transmission links of the MIMO transmission device, wherein the OFDM carrier transmission sequences comprise long training fields for estimating an equivalent channel for OFDM-MIMO transmission and data fields, and further comprise SIG-B fields between the long training fields and the data fields in a multiuser mode;

a pulse shaping multiphase filter, used for carrying out upsampling and downsampling processing on single-carrier transmission symbol sequences to form single-carrier transmission sequences with sampling rates of Y;

a digital-to-analog converter, used for carrying out digital-to-analog conversion on the single-carrier transmission sequences and the OFDM carrier transmission sequences; and a transmitter radio frequency module, used for transmitting analog signals after the digital-to-analog conversion;

the receiver comprises:

a receiver radio frequency module, used for receiving data transmitted by the transmitter and outputting the analog signals;

an analog-to-digital converter, used for sampling the analog signals at the sampling rate of Y to obtain symbol sequences with sampling rates of Y;

a matching multiphase filter, used for carrying out upsampling and downsampling processing on single-carrier sequences to obtain single-carrier reception sequences with sampling rates of X;

a single-carrier signal demodulation module, used for carrying out channel estimation and demodulating the single-carrier reception sequences to obtain configuration information of SIG-A, and configuring the receiver according to the configuration information of the SIG-A; and an OFDM signal demodulation module, used for carrying out OFDM-MIMO channel estimation and demodulating OFDM reception sequences to obtain transmitted data.

\* \* \* \* \*